United States Patent
Kawamura

[11] Patent Number: 6,078,009
[45] Date of Patent: *Jun. 20, 2000

[54] CORRUGATED TUBE

[75] Inventor: Shigeto Kawamura, Yokkaichi-cho, Japan

[73] Assignee: Sumitomo Wiring Systems, Ltd., Yokkaichi, Japan

[ * ] Notice: This patent is subject to a terminal disclaimer.

[21] Appl. No.: 09/027,226

[22] Filed: Feb. 20, 1998

[30] Foreign Application Priority Data

Feb. 21, 1997 [JP] Japan ..................................... 9-038076

[51] Int. Cl.[7] ..................................................... H01B 7/18

[52] U.S. Cl. .................. 174/102 R; 174/102 D; 174/68.3; 138/162

[58] Field of Search ................. 174/138, 102 D, 174/102 R, 102 SP, 102 E, 63.8; 138/162

[56] References Cited

U.S. PATENT DOCUMENTS 4,422,478 12/1983 Pentney et al. .......................... 138/168
4,513,787 4/1985 Hegler et al. ............................ 138/166

*Primary Examiner*—Kristine Kincaid
*Assistant Examiner*—William H Mayo, III
*Attorney, Agent, or Firm*—Greenblum & Bernstein, P.L.C.

[57] ABSTRACT

A corrugated tube has alternating ridge and trough shapes, viewed in longitudinal cross-section. The tube also has a slit along its longitudinal direction, thereby forming first and second portions flanking the slit. The first and second zones comprise a first and a second end portion of the ridge shapes, respectively. The first end portion forms a convex portion, while the second end portion forms a sequential convex and concave portion. Each portion extends from the slit side around the opposing circumferential directions, thereby forming female and male locking portions, respectively. When the male locking portions are inserted under the female locking portions, the convex portion of the first zone and the sequential convex and concave portion of the second zone are stacked and the slit is firmly locked.

17 Claims, 8 Drawing Sheets

CORRUGATED TUBE

BACKGROUND OF THE INVENTION

1. Field of the Invention

The present invention relates to a corrugated tube for containing and protecting a wiring harness, e.g., in motor vehicles such as automobiles. More particularly, the invention concerns a corrugated tube having a longitudinal slit along its longitudinal direction. A wiring harness is composed of a plurality of electrical wires. In the construction according to the present invention, the slit is first opened and the wiring harness is inserted into the corrugated tube sideways through this slit. Further, once the harness is inserted, the slit is firmly closed in an easy manner.

2. Description of Background Information

In a wiring harness used for automobiles, some portions thereof, where necessary, are wrapped in a corrugated tube and thus protected. Examples of known corrugated tubes for such applications include:

- tubes having a slit S along their axial direction (type 1-1), shown in FIG. 1A;
- tubes having no slit (type 1-2), shown in FIG. 1B;
- tubes similar to those of type 1-1, but further having zones R which are overlapped in the circumferential direction of the tube (type 1-3), shown in FIG. 1C.

In the case of corrugated tube 1-2 without slit, when a connector housing is initially mounted on an end portion of the electrical wires W, the latter cannot be passed through the corrugated tube 1-2. Therefore, the electrical wires must first be placed in the corrugated tube 1-2 and only then can the connector housing be mounted on the end portion of the wires. When the connector housing is subsequently mounted, the end portion of each electrical wire cannot be inserted thereinto by an automated process. Consequently, the automation of the assembly process becomes difficult.

In the case of corrugated tube 1-1 with a slit, a group of electrical wires W is inserted by opening the slit. The connector housing can thus be mounted onto the end portion of the electrical wires beforehand. Accordingly, an automated process can be envisaged for inserting the end portion into the connector housing. However, when the zone protected by the corrugated tube is bent as illustrated in FIG. 2, the slit may be opened. It is therefore necessary to lock the slit, once the electrical wires W have been inserted. To this end, a tape can be wound around the outer circular surface of the tube 1-1. However, this task is cumbersome.

A corrugated tube 1-3 with an overlap-type slit S shown in FIG. 1C, differs from the above, solely in that the overlapping zone on one side of the slit is superposed on a corresponding zone of the other side of the slit. Nevertheless, it is still necessary to use tape in order to lock the slit securely. As mentioned, this task is cumbersome.

SUMMARY OF THE INVENTION

In copending U.S. application Ser. No. 08/922,352 which was filed Sep. 3, 1997, the entire disclosure of which is hereby incorporated by reference, and in which a claim for priority has been made based on Japanese Application No. 8-273442, filed Oct. 16, 1996 and Japanese Application No. 8-232783, filed Sep. 3, 1996, the disclosures of which are also incorporated in there entirety herein, there is also known a corrugated tube having a ridge shape and a trough shape, viewed on an axial cross-section, alternatingly provided throughout the axial direction, and having a slit along the longitudinal direction. The slit defines first and second zones therealong, the first zone comprising a first end portion of the ridge shapes and the second zone comprising a second end portion of the ridge shapes. The first and second end portions are further provided with a first and a second sequence having a repeating unit of concave and convex portions, viewed from the axial direction of the tube. The first and second sequences extend respectively from the slit along the opposing circumferential directions of the tube, thereby forming female and male locking portions, respectively. In this construction, the male locking portions are inserted under the female locking portions, whereby the first and second sequences are fittingly stacked and the slit is locked in a closed state.

In this construction, the female locking portions may have a width, measured along the axial direction, greater than the width of the male locking portions. Also, the female locking portions may comprise, starting from the slit side, an L-shaped convex, a concave and a convex sequence, when viewed on a lateral cross-section while the male locking portions may comprise an inverted-V shaped convex, a concave and a convex sequence. After the slit is opened and the electrical wires are inserted into the tube, the female locking portions and the male locking portions are fitted together, whereby the slit is locked in a closed state.

An object of the present invention is to remedy the above-mentioned drawbacks, and to enable automated insertion of an electrical terminal into a connector housing and locking of the slit by one single operation, thereby reducing the amount of taping required.

To this end, there is provided a corrugated tube having a ridge shape and a trough shape, viewed on an axial cross-section thereof, alternatingly provided throughout the longitudinal direction thereof, and having a slit throughout the longitudinal direction, the slit defining a first and a second zone respectively including a first and a second end portion of the ridge shapes, the first end portion comprising a convex portion having a cross-section of inverted-U section, viewed from the axial direction, the convex portion extending from the slit side around a first circumferential direction of the tube, thereby forming female locking portions, the second end portion comprising a sequence of a convex portion having a cross-section of inverted-U section and a concave portion, the sequence extending from the slit side around a second circumferential direction of the tube, opposed to the first circumferential direction, thereby forming male locking portions, the female locking portions being superposed on the male locking portions, whereby the slit is locked in a closed state.

Preferably, the female locking portions have a width, measured along the longitudinal direction of the tube, greater than the width of the male locking portions. More preferably, the convex portion of the female locking portions has a length, measured around the circumferential direction of the tube, greater than the length of the convex portion of the male locking portions.

Further, the convex portion of the female locking portions may comprise an outermost side wall having an inner face, viewed from the axis of the tube, while the convex portion of the male locking portions may comprise a side wall, the side wall being shared with the concave portion thereof and having an outer face, viewed from the axis of the tube. The inner face of the female locking portions and the outer face of the male locking portions extend in a substantially diametrical direction, and wherein the inner face has a height, measured along the diametrical direction, equal to, or greater than, that of the outer face.

The present invention also includes a corrugated tube in combination with a wiring harness composed of a plurality of electrical wires. In this embodiment, the electrical wires are inserted into the tube after opening the slit and the female locking portions are superposed on the male locking portions, whereby the slit is locked in a closed condition.

In the aforementioned embodiments, the female locking portions, formed on one side of the slit, are covered on the male locking portions, formed on the other side thereof, such that the convex portion of the former is superposed on the outer surface of the convex portion of the latter. Also, the convex portion of the former has a diametrical lifting wall, viewed from the axial direction, adjacent to the slit, as well as a diametrical inward-looking wall-end. When applied, the wall-end is fitted into the concave portion of the male locking portions. At the same time, it is abutted against a diametric lifting, outside facing surface of the convex portion of the male locking portions. In this manner, the slit is closed and locked by one press-fit operation. Thus, taping work can be reduced or eliminated.

Further, the female locking portions have a width, measured along the longitudinal direction of the tube, greater than that of the male locking portions. By virtue of this configuration, the male locking portions can be easily inserted under the female locking portions, relative to the axis of the tube.

As can be seen from the above, the electrical wires, which constitute a wiring harness, are inserted into the tube by opening the slit, the female locking portions are overlapped onto the male locking portions, and the slit is locked in a closed condition. Also, the stacked concave portions are interposed between the stacked convex portions, so that the slit is securely locked.

This sequential action is very simple and the slit is closed and locked by a single press-fit operation. The after-taping is thus no longer needed. Further, only the ridge portions, and not the trough portions, lock the corrugated tube. This structure allows the tube to retain flexibility. By virtue of this flexibility, the electrical wires can be easily bent and cabled along a vehicle.

BRIEF DESCRIPTION OF THE FIGURES

The above and other objects, features and advantages of the present invention will become apparent from the following description of the preferred embodiments, given as a non-limiting example, with reference to the accompanying drawings, in which.

DETAILED DESCRIPTION OF THE PREFERRED EMBODIMENTS

Figure 1A:
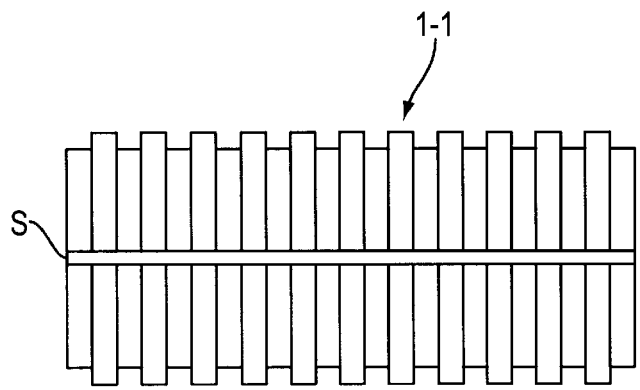
FIG. 1A shows a known corrugated tube with a slit.
Figure 1B:
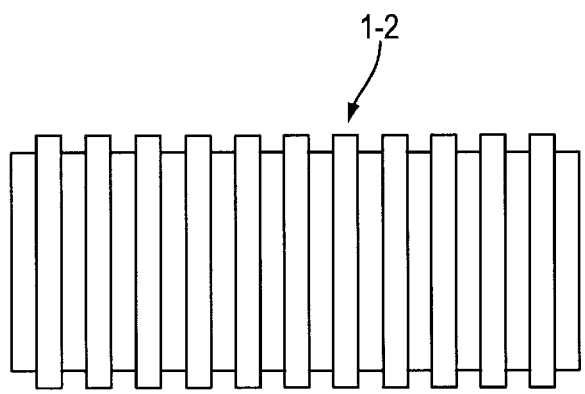
FIG. 1B shows a known corrugated tube without a slit.
Figure 1C:
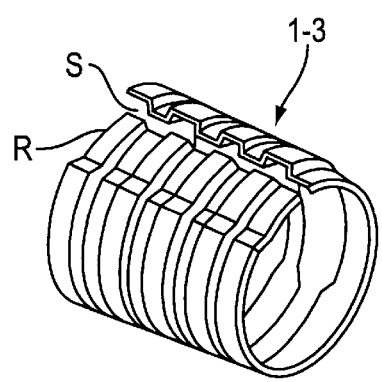
FIG. 1C shows a known corrugated tube with a slit and overlapping zones.
Figure 2:
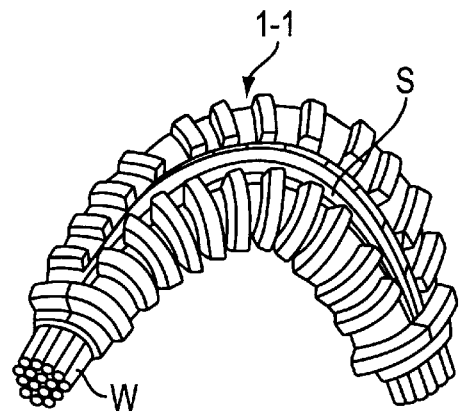
FIG. 2 illustrates a known corrugated tube when a slit thereof is unlocked by a bending force.
Figure 3A:
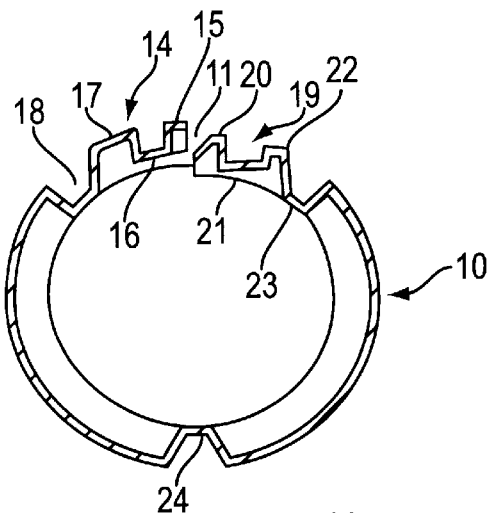
FIG. 3A is a lateral cross-sectional view of a corrugated tube, the cross-section being taken through only ridge portions.
Figure 3B:
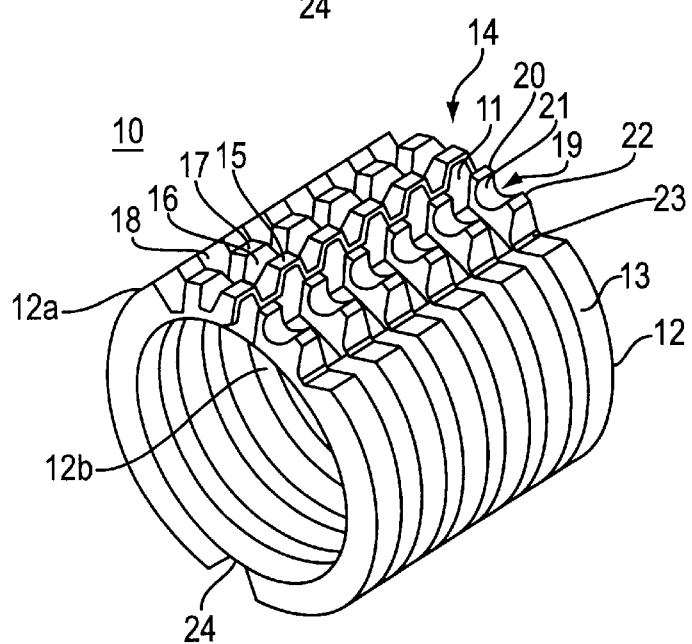
FIG. 3B is a perspective view of the corrugated tube shown in FIG. 3A.

For a better understanding of the invention, an embodiment already described in the copending application noted above, U.S. patent application Ser. No. 08/922,352, filed Sep. 3, 1997, will be described hereinafter. In the embodiment shown in FIGS. 3A and 3B, the corrugated tube 10 has a slit 11 extending along the longitudinal direction L. In addition, a circular ridge shape 12 and a circular trough shape 13 are alternatingly provided at a predetermined pitch along the longitudinal direction.

First and second zones are provided along the slit 11 at respective sides thereof. These zones include the part 12a, 12b of all the ridge shapes 12 adjacent to the slit 11. This part of the ridge shapes is provided with a concave and convex shape, viewed from a lateral cross-section, around the circular direction. The convex and concave portions can be superposed on each other by one press-fit operation, thereby closing the slit 11.

Figure 4:
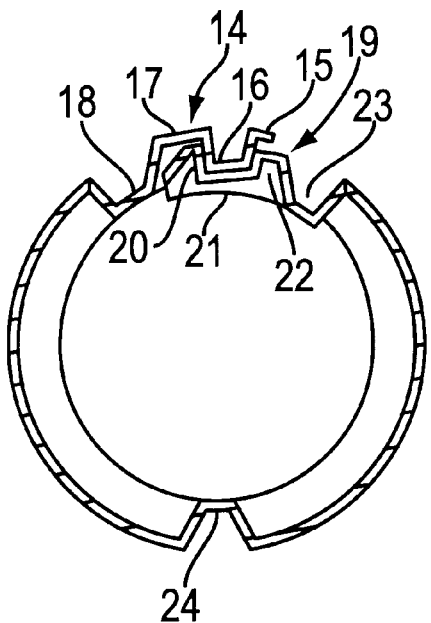
FIG. 4 shows the corrugated tube of FIGS. 3A and 3B when the slit is locked, a cross-section being taken through only ridge portions.

Part 12a of the first zone constitutes female locking portion 14. The latter comprises, sequentially from the slit side and around the circular direction, end convex portion 15 having an open end and an L-shaped cross-section, a concave portion 16, a convex portion 17 and a concave positioning groove 18, used for positioning the tube when cutting (see FIG. 4). Part 12b constitutes male locking portion 19. The latter comprises, in a same manner, a convex portion 20 having an inverted V-shaped cross-section, a concave portion 21, a convex portion 22 and a concave positioning groove 23, used for positioning the tube when cutting.

Figure 5:
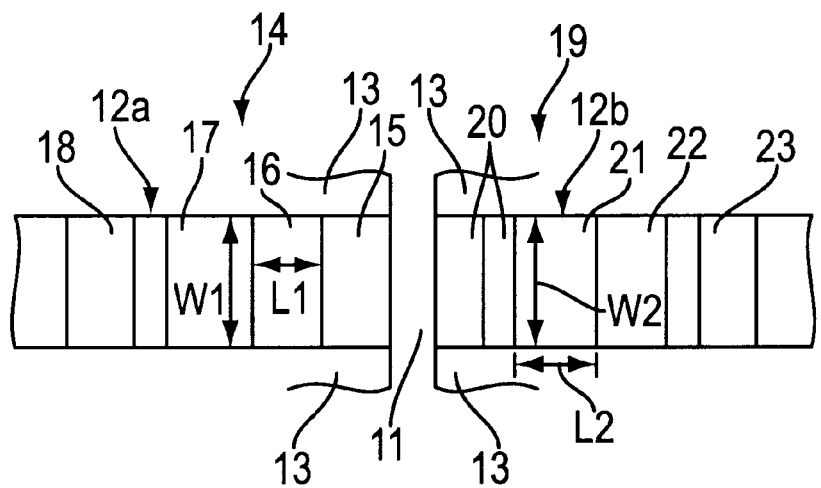
FIG. 5 shows a top plan view on the locking portions of the corrugated tube of FIGS. 3a and 3B.

As shown in FIG. 5, the female locking portion 14 (end convex portion 15, concave portion 16 and convex portion 17) have a width W1, measured in the axial direction, which is broader than the width W2 of the male locking portion 19 (convex portion 20, concave portion 21 and convex portion 22), i.e., W1>W2. Thus, the male locking portion 19 can be positioned inside the female locking portion 14, viewed on the cross-section of the tube. Further, a substantially V-shaped notch 24 is formed at a position diametrically opposed to that of the slit 11. Moreover, the concave portion 21 of the male locking portion 19 has a length L2, measured around the circular direction, greater than that of L1 of the concave portion 16 of the female locking portion 14, i.e., L1<L2.

Figure 6A:
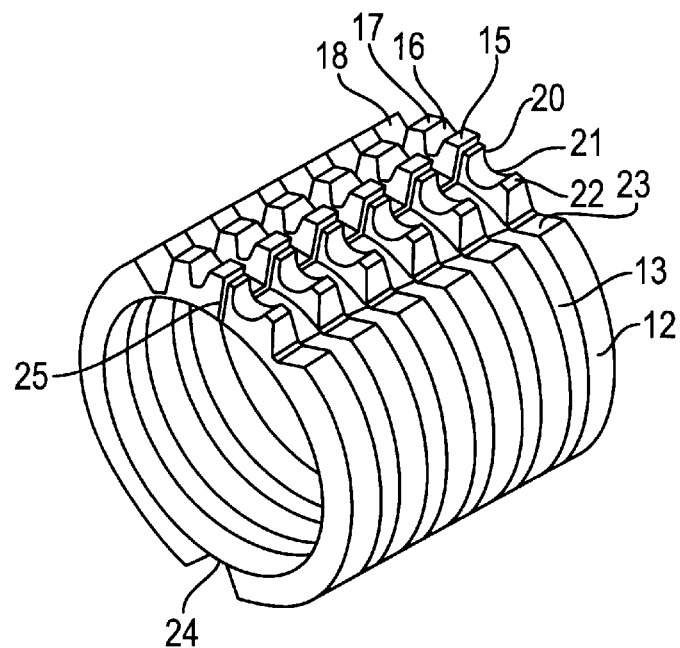
FIG. 6A is a perspective view of the tube shown in FIGS. 3A and 3B during its manufacturing process.
Figure 6B:
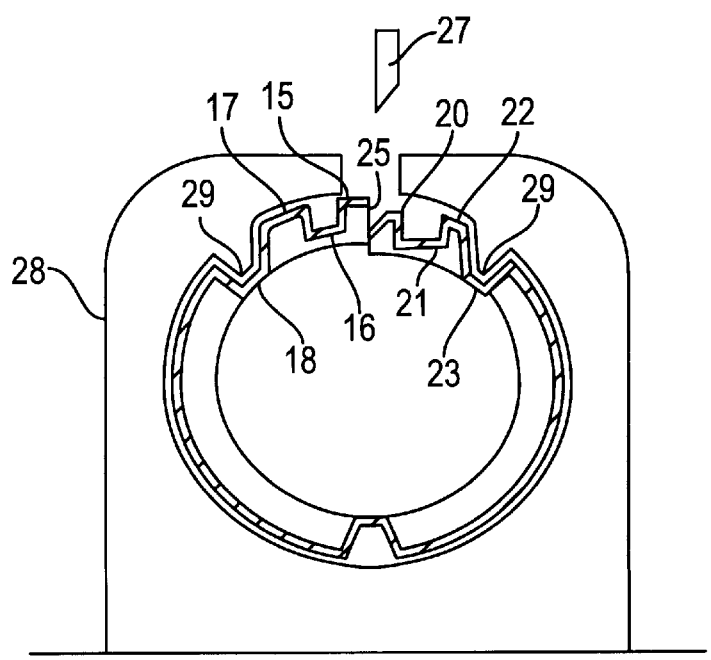
FIG. 6B is a cross-sectional view of the tube shown in FIGS. 3A and 3B when installed in a holding device before cutting, the cross-section being taken through only ridge portions.

As shown in FIGS. 6A and 6B, the corrugated tube 10 is initially manufactured in a cylindrical shape, such that the end convex portion 15 of the female locking portion 14 has an edge connected to that of the end convex portion 20 of the male locking portion 19 via a diametrically extending wall 25. This connecting wall 25 is cut by a cutter 27, thereby forming a slit 11 with its female locking portion 14 and male locking portion 19 separated by this slit. The tube has a concave positioning groove 18, 23 provided on each side of the slit 11. When using the cutter 27, the tube is placed in a holding device 28 having a pair of holding ribs 29 and maintained in the device by fitting the ribs 29 into the corresponding concave portions 18, 23.

Figure 7A:
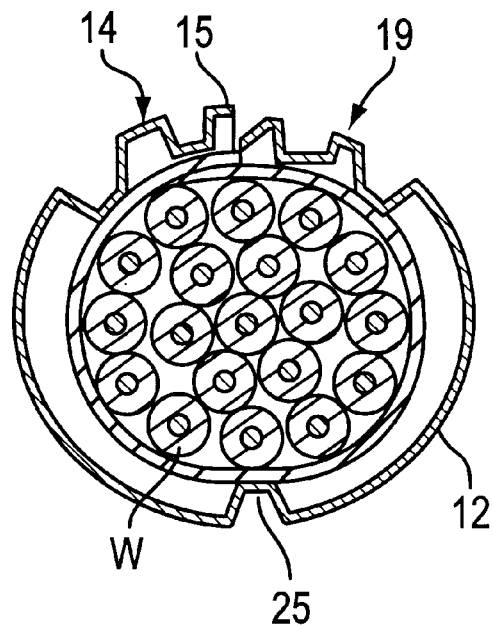
FIGS. 7A and 7B show a view on a lateral cross-section of the corrugated tube of FIGS. 3A and 3B when loaded with electrical wires, respectively, before and after locking, the cross-sections being taken through ridge portions and a member around the wires.

In the above tube with a slit 11, the connector housing (not shown in the figures) is first connected to the end of the electrical wires W. The slit 11 of the corrugated tube 10 is then opened, as illustrated in FIG. 7A, and the wires W are inserted therethrough into the tube.

Figure 7B:
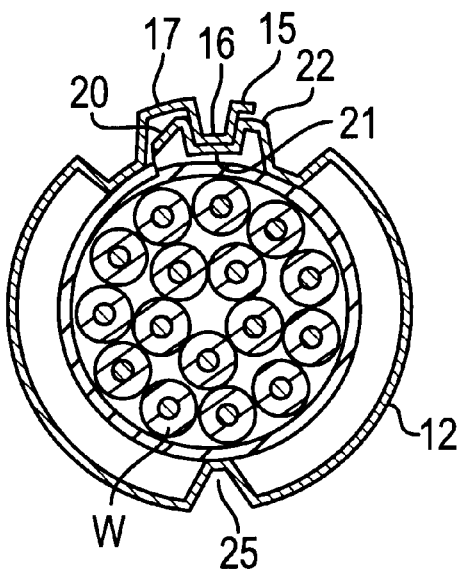

The female and male locking portions 14, 19, flanking the slit 11, are then brought closer together and the male locking portion 19 is brought under the female locking portion 14, as shown in FIG. 7B. As the tube is provided with a V-shaped notch 24 at a position diametrically opposed to the slit 11, the male and female locking portions are smoothly moved closer and overlapped.

The V-shaped end convex portion 20 of the male locking portion 19 is first brought under the L-shaped end convex portion 15 of the female locking portion 14. The end convex portion 20 is advanced beyond the concave portion 16 and fitted into the convex portion 17. At the same time, the concave portion 21 of the male locking portion 19 is tightly superposed to the concave portion 16 of the female locking portion 14. Likewise, the convex portion 22 of the male locking portion 19 is superposed to the end convex portion 15 of the female locking portion 14.

Consequently, three sequential concave and convex portions of the female locking portion 14 are fitted onto the three sequential concave and convex portions of the male locking portion 19. In particular, the fitted concave portions 16, 21 are sandwiched between two stacked convex portions. Moreover, this type of fixture is effected for all the ridge shapes along the axial direction of the corrugated tube 10. For this reason, both locking portions 14, 19 are securely locked and the slit 11 is tightly closed. As the result, the taping work, hitherto necessary for preventing the slip opening, can be reduced or eliminated.

Compared to the above, the corrugated tube 40, according to the present invention, has a simpler structure.

Figure 8A:
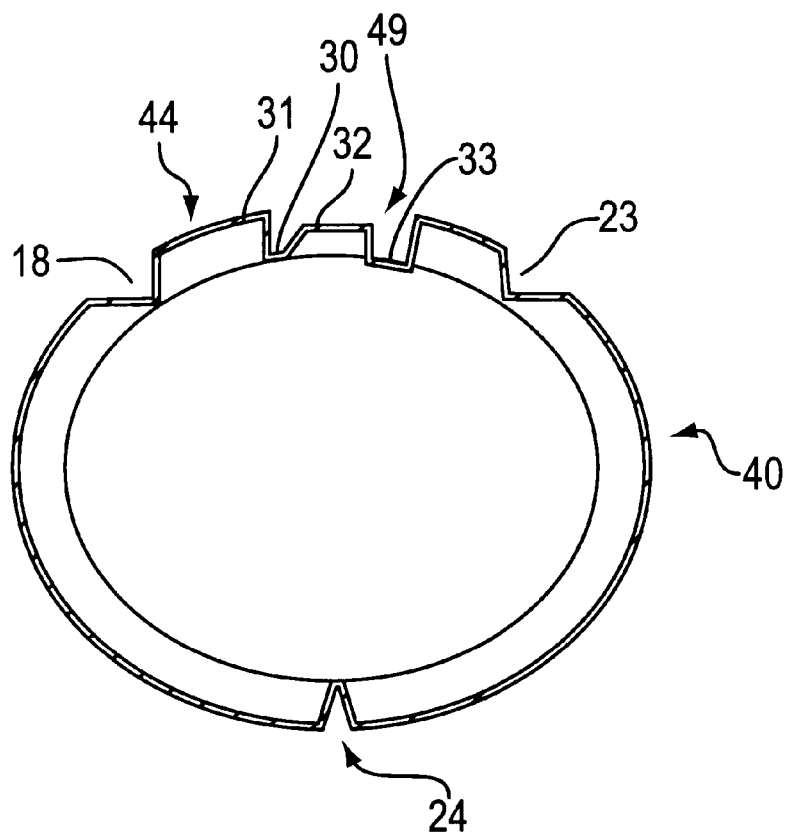
FIGS. 8A and 8B show a view on a lateral cross-section and a perspective view, respectively, of the corrugated tube according to the present invention, the cross-section in FIG. 8A being taken through only ridge portions.
Figure 8B:
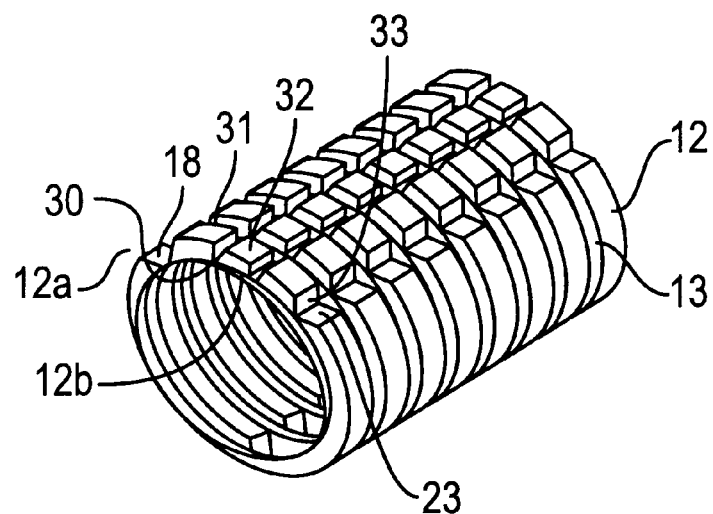

In particular, as shown in FIGS. 8A and 8B, the corrugated tube 40 comprises a slit 30 extending throughout the longitudinal direction L of the tube 40. Also, a circular ridge shape 12 and a circular trough shape 13 are alternatingly arranged at a predetermined pitch along the longitudinal direction.

The above slit 30 divides the tube in the longitudinal direction and forms first and second zones on the rim thereof. The first zone comprises part 12a of the ridge shapes adjacent to the slit 30 and constitutes female locking portion 44. Likewise, the second zone comprises part 12b of the ridge shapes adjacent to the slit 30 and constitutes the male locking portion 49. The slit 30 can be closed and locked by one press-fit operation.

The part of the ridge shapes 12a (female locking portion 44) forms a convex portion 31 having an inverted-U shape, viewed from a lateral cross-section, extending from the slit side around the circular direction. At a position adjacent to the convex portion 31 is provided a concave positioning groove 18, used for fixing the tube before cutting. The part of the ridge shapes 12b (male locking portion 49) comprises, sequentially as viewed from the slit side around the circular direction, a convex portion 32 having an inverted-U shape and a concave portion 33. At a position adjacent to the latter is provided a concave positioning groove 23, used for fixing the tube before cutting.

Figure 10:
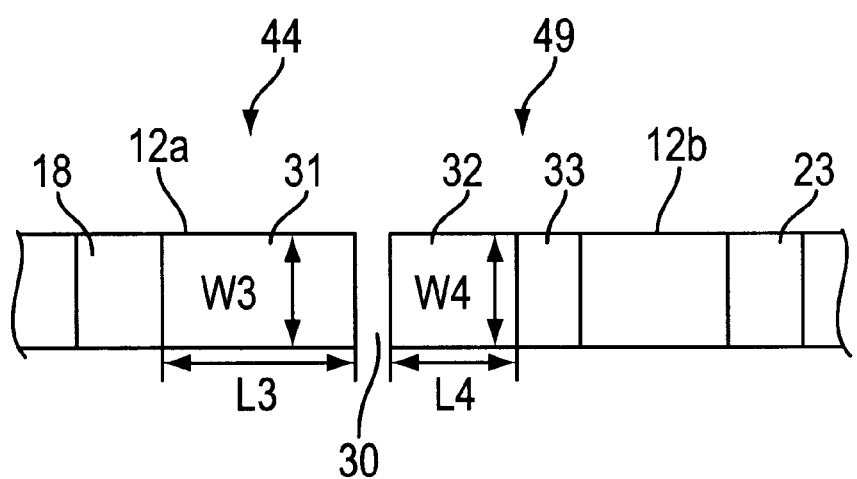
FIG. 10 shows a top plan view on the locking portions of the corrugated tube of FIG. 8.

As shown in FIG. 10, the convex portion 31 of the female locking portion 44 has a width W3, measured along the longitudinal direction, greater than the width W4 of the convex and concave portions 32, 33 of the male locking portion 49., i.e., W3>W4. In addition, the length L3 of the former 31 is designed to be greater than the length L4 of the convex portion 32 of the male locking portion 49, i.e., L3>L4. Thus, the former can contain the latter and both can be properly superposed.

Figure 9:
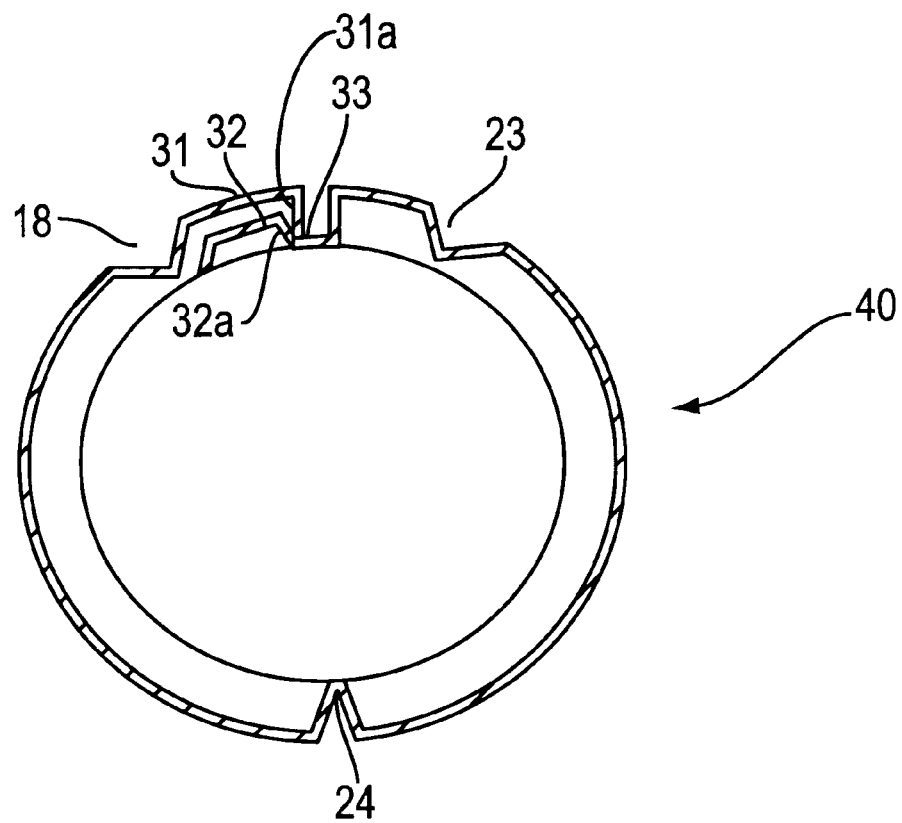
FIG. 9 shows a view on a lateral cross-section of the corrugated tube of FIG. 8, the cross-section being taken through only ridge portions.

As shown in FIG. 9, the height of the internal face of the side wall 31a contained in the convex portion 31 of the female locking portion 44 is equal to, or greater than, the height of the external face of the side wall 32a contained in the convex portion 32 of the male locking portion 49. Thus, the edge of the side wall of the convex portion 31 in the female locking portion 44 is abutted against the base of the concave portion 33 in the male locking portion 49.

Such a corrugated tube 40 is initially formed in a cylindrical form, such that the wall edge of the convex portion 31 in the female locking portion 44 and the wall edge of the convex portion 32 in the male locking portion 49 are positioned adjacent to each other and integrally formed. As in the case of the corrugated tube 10 shown in FIG. 4B, the tube 40 is placed in the holding device 28, such that the concave positioning grooves 18, 23 are engaged with the corresponding ribs 29.

The line corresponding to the wall edge of the convex portion 31 in the female locking portion 44 and of the convex portion 32 in the male locking portion 49 is then cut by a cutter 27, so that there is formed a slit 30, with its female locking portion 44 and male locking portion 49 separated by this slit.

Figure 11A:
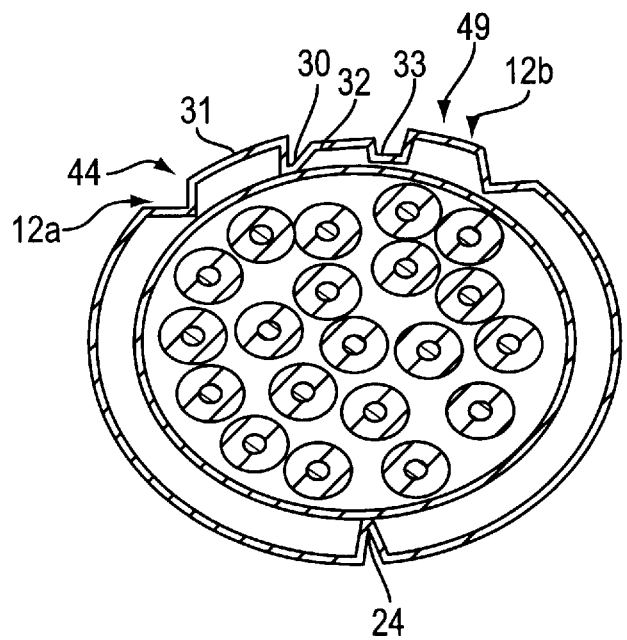
FIGS. 11A and 11B show a view on a lateral cross-section of the corrugated tube of FIG. 8 when loaded with electrical wires, respectively, before and after locking, the cross-sections being taken through ridge portions and a member around the wires.
Figure 11B:
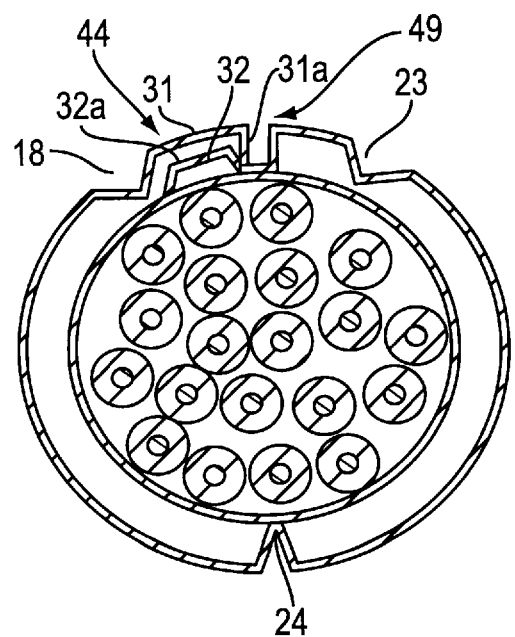

As mentioned above, the corrugated tube 40 according to the present invention is provided with a slit 30. The connector housing (not shown in the figures) can therefore by connected to the end of electrical wires beforehand. The slit 30 of the tube 40 is then opened, as shown in FIG. 11A and the wires are inserted into the tube. Subsequently, the first zone extending along one side of the slit 30 of the tube 40 is lifted up from the group of the wires W and placed upon the corresponding second zone. In this way, the part of the ridge shapes 12a of the female locking portion 44 is superposed on the corresponding part of the ridge shapes 12b of the male locking portion 49, located on the other side of the slit 30. Accordingly, the convex portion 31 contained in the part 12a of the female locking portion 44 is overlapped on the convex portion 32 contained in the part 12b of the male locking portion 49 along the length of the slit 30. Also, as shown in FIG. 11B, the side wall 31a of the female-side convex portion 31 is engaged with the side wall 32a of the male-side convex portion 32 in the adjacent concave portion 33. In this way, the slit 30 can be locked by one single operation and the tape-winding task to ensure the closure of the slit can be reduced or eliminated. Moreover, the internal depth of the side wall 31a of the convex portion 31 is arranged to be equal to, or greater than, the external depth of the side wall 32a of the convex portion 32, so that the wall edge of the side wall 31a is anchored on the base of the male-side concave portion 33. This structure ensures a constant clamping force.

In the corrugated tube 40 according to the present invention, the number of concave and convex portions, formed on the ridge shapes, can be reduced compared to the previous tube. Therefore, the above-mentioned technique is easily applicable to a small-diameter corrugated tube, for which the integration of locking portions is usually difficult.

However, the object of the present invention is not limited to the above-mentioned embodiments. The locking portions may be formed on just some of the ridge shapes 12 located at both end regions in the axial direction of the tube, instead of being installed throughout the axial direction thereof. Also, the pitch of the ridge shapes may be varied and appropriately spaced.

Further, the corrugated tube is manufactured in a cylindrical form. By simply cutting the tube, a slit can be formed together with the female and male locking portions. The invention can therefore be put into practice very easily.

The present application is related to Japanese Patent Application No. 9-038076, filed Feb. 21, 1997, the disclosure of which is incorporated in its entirety herein.

What is claimed:

1. A corrugated tube having alternating ridge and trough shapes viewed from a longitudinal cross-section thereof, provided along at least a portion of a length of the corrugated tube, and having a slit extending throughout an entire length of the corrugated tube, said slit defining a first and a second zone respectively including a first and a second end portion of said ridge shapes, said first end portion comprising a convex portion having a cross-section forming an inverted-U shape, as viewed from said longitudinal cross-section thereof, said convex portion extending from a side of said slit around a first circumferential direction of said tube, thereby forming female locking portions, said second end portion comprising a sequence of a convex portion having a cross-section forming an inverted-U shape, and a concave portion, said sequence extending from said side of said slit around a second circumferential direction of said tube, opposed to said first circumferential direction, thereby forming male locking portions, said female locking portions being stackable on said male locking portions, said male locking portions and said female locking portions being molded only on said ridge shapes of the tube, and said trough shapes being substantially circular in cross section so that the tube covering the wiring harness is bendable primarily in said trough shapes into a desired shape; and whereby said slit can be locked in a closed state.

2. The corrugated tube according to claim 1, wherein said female locking portions have a width, measured along a longitudinal direction of said tube, greater than a width of said male locking portions.

3. The corrugated tube according to claim 2, wherein said convex portion of said female locking portions has a length, measured around a circumferential direction of said tube, greater than a length of said convex portion of said male locking portions.

4. The corrugated tube according to claim 3, wherein said convex portion of said female locking portions comprises an outermost side wall having an inner face, viewed from an axis of said tube, while said convex portion of said male locking portions comprises a side wall, said side wall being shared with said concave portions of said male locking portions and having an outer face, viewed from said axis of said tube, said inner face of said female locking portions and said outer face of said male locking portions extending in a substantially diametrical direction, and wherein said inner face has a height, measured along said diametrical direction, at least equal to a height of said outer face.

5. The corrugated tube according to claim 3, in combination with a wiring harness comprising a plurality of electrical wires, said wires being inserted into said tube after opening said slit, and said female locking portions is superposed on said male locking portions, whereby said slit is locked in a closed condition.

6. The corrugated tube according to claim 4, in combination with a wiring harness comprising a plurality of electrical wires, said wires being inserted into said tube after opening said slit, and said female locking portions is superposed on said male locking portions whereby said slit is locked in a closed condition.

7. The corrugated tube according to claim 2, in combination with a wiring harness comprising a plurality of electrical wires, said wires being inserted into said tube after opening said slit, and said female locking portions is superposed on said male locking portions, whereby said slit is locked in a closed condition.

8. The corrugated tube according to claim 2, wherein said convex portion of said female locking portions comprises an outermost side wall having an inner face, viewed from an axis of said tube, while said convex portions of said male locking portions comprises a side wall, said side wall being shared with said concave portion of said male locking portion and having an outer face, viewed from said axis of said tube, said inner face of said female locking portions and said outer face of said male locking portions extending in a substantially diametrical direction, and wherein said inner face has a height, measured along said diametrical direction, at least equal to a height of said outer face.

9. The corrugated tube according to claim 8, in combination with a wiring harness comprising a plurality of electrical wires, said wires being inserted into said tube after opening said slit, and said female locking portions is superposed on said male locking portions, whereby said slit is locked in a closed condition.

10. The corrugated tube according to claim 1, wherein said convex portion of said female locking portions has a length, measured around a circumferential direction of said tube, greater than a length of said convex portion of said male locking portions.

11. The corrugated tube according to claim 10, wherein said convex portion of said female locking portions comprises an outermost side wall having an inner face, viewed from an axis of said tube, while said convex portion of said male locking portions comprises a side wall, said side wall being shared with said concave portion of said male locking portions and having an outer face, viewed from said axis of said tube, said inner face of said female locking portions and said outer face of said male locking portions extending in a substantially diametrical direction, and wherein said inner face has a height, measured along said diametrical direction, at least equal to a height of said outer face.

12. The corrugated tube according to claim 11, in combination with a wiring harness comprising a plurality of electrical wires, said wires being inserted into said tube after opening said slit, and said female locking portions is superposed on said male locking portions, whereby said slit is locked in a closed condition.

13. The corrugated tube according to claim 10, in combination with a wiring harness comprising a plurality of electrical wires, said wires being inserted into said tube after opening said slit, and said female locking portions is superposed on said male locking portions, whereby said slit is locked in a closed condition.

14. The corrugated tube according to claim 1, wherein said convex portion of said female locking portions comprises an outermost side wall having an inner face, viewed from an axis of said tube, while said convex portions of said male locking portions comprises a side wall, said side wall being shared with said concave portion of said male locking portions and having an outer face, viewed from said axis of said tube, said inner face of said female locking portions and said outer face of said male locking portions extending in a substantially diametrical direction, and wherein said inner face has a height, measured along said diametrical direction, at least equal to a height of said outer face.

15. The corrugated tube according to claim 14, in combination with a wiring harness comprising a plurality of electrical wires, said wires being inserted into said tube after opening said slit, and said female locking portions is superposed on said male locking portions, whereby said slit is locked in a closed condition.

16. The corrugated tube according to claim 1, in combination with a wiring harness comprising a plurality of electrical wires, said wires being inserted into said tube after opening said slit, and said female locking portions is superposed on said male locking portions whereby said slit is locked in a closed condition.

17. The corrugated tube according to claim 1, further comprising:

a notch extending longitudinally through the ridge shapes, on an opposite side of said tube to the male and female locking portions, for permitting circumferential flexion during locking.

* * * * *

UNITED STATES PATENT AND TRADEMARK OFFICE
CERTIFICATE OF CORRECTION

PATENT NO. : 6,078,009
DATED : June 20, 2000
INVENTOR(S) : S. KAWAMURA

It is certified that error appears in the above-identified patent and that said Letters Patent is hereby corrected as shown below:

At column 8, line 28 (claim 8, line 4) of the printed patent, "portions" should be ---portion---.

At column 8, line 31 (claim 8, line 7) of the printed patent, "portion" should be ---portions---.

At column 9, line 8 (claim 14, line 4) of the printed patent, "portions" should be ---portion---.

At column 7, line 67 (claim 4, line 6) of the printed patent, "portions" should be ---portion---.

At column 10, line 9 (claim 16, line 5) of the printed patent, after "portion" insert --- , ---.

At column 8, line 17 (claim 6, line 5) of the printed patent, after "portion" insert --- , ---.

Signed and Sealed this

Twenty-second Day of May, 2001

Attest:

NICHOLAS P. GODICI

*Attesting Officer*     *Acting Director of the United States Patent and Trademark Office*